United States Patent Office 3,301,878
Patented Jan. 31, 1967

3,301,878
NOVEL PROCESS FOR THE PREPARATION OF TRIENIC STEROIDS AND INTERMEDIATES THEREIN
Robert Joly, Montmorency, Julien Warnant, Neuilly-sur-Seine, Jean Jolly, Clichy-sous-Bois, and Jacques Prost-Marechal, Paris, France, assignors to Roussel-Uclaf, Paris, France, a corporation of France
No Drawing. Filed May 24, 1965, Ser. No. 458,463
Claims priority, application France, May 27, 1964, 976,020
16 Claims. (Cl. 260—397.3)

The invention relates to a novel process for the preparation of 13β-alkyl-$\Delta^{4,9,11}$-gonatrienes of the formula

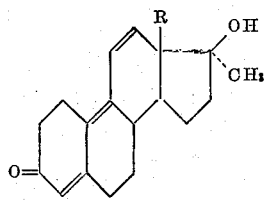

wherein R is an alkyl radical of 1 to 4 carbon atoms. The invention also relates to novel intermediates formed therein.

The compounds of Formula I possess interesting pharmacological properties, particularly anabolic activity. For example, 17α-methyl-$\Delta^{4,9,11}$-estratriene-17β-ol-3-one has remarkable anabolic and androgenic activity. The said compound has been prepared according to the process described in commonly assigned, copending U.S. application Serial No. 397,628, filed September 18, 1964 now U.S. Pat. 3,248,294, which comprises reacting $\Delta^{4,9,11}$-estratriene-17β-ol-3-one with hydroxylamine or a lower alkyl derivative thereof to form 3-oximido-$\Delta^{4,9,11}$-estratriene-17β-ol, oxidizing the latter by the Oppenauer reaction to form 3-oximido-$\Delta^{4,9,11}$-estratriene-17-one, reacting the latter with a methyl magnesium halide to form 3 - oximido-17α-methyl-$\Delta^{4,9,11}$-estratriene-17β-ol and subjecting the latter to acid hydrolysis.

It is an object of the invention to provide a novel process for the preparation of 13β-alkyl-17α-methyl-$\Delta^{4,9,11}$-gonatrienes of Formula I.

It is another object of the invention to provide novel intermediates for 13β-alkyl-17α-methyl-$\Delta^{4,9,11}$-gonatrienes of Formula I.

These and other objects and advantages of the invention will be obvious from the following detailed description.

The novel process of the invention for the preparation of 13β-alkyl-17α-methyl-$\Delta^{4,9,11}$-gontriene-17β-ol-3-ones of Formula I comprises reacting 13β-alkyl-$\Delta^{4,9,11}$-gonatriene-3,17-dione wherein the alkyl has 1 to 4 carbon atoms with a derivative of hydrocyanic acid to form 13β-alkyl-17α - cyano-$\Delta^{4,9,11}$-gonatriene-17β-ol-3-one, reacting the latter with a compound selected from the group consisting of hydroxylamine, lower alkyl hydroxylamine and acid addition salts thereof to form the corresponding 3-oximido - 13β-akyl-17α-cyano-$\Delta^{4,9,11}$-gonatriene-17β-ol, subjecting the latter to a compound selected from the group consisting of a basic agent and a weak organic acid to form 3-oximdo-13β-alkyl-$\Delta^{4,9,11}$-gonatriene-17-one, reacting the latter with a methyl magnesium halide to form 3 - oximido - 13β - alkyl-17α-methyl-$\Delta^{4,9,11}$-gonatriene-17β-ol and subjecting the latter to acid hydrolysis to form 13β - alkyl - 17α - methyl-$\Delta^{4,9,11}$-gonatriene-17β-ol-3-one. An outstanding feature of the process is the protection of 17-keto group in the form of a cyanohydrin which is easily removed to obtain the free 17-keto group after oximidation in the 3-position. The reaction scheme is illustrated in Table I.

TABLE I

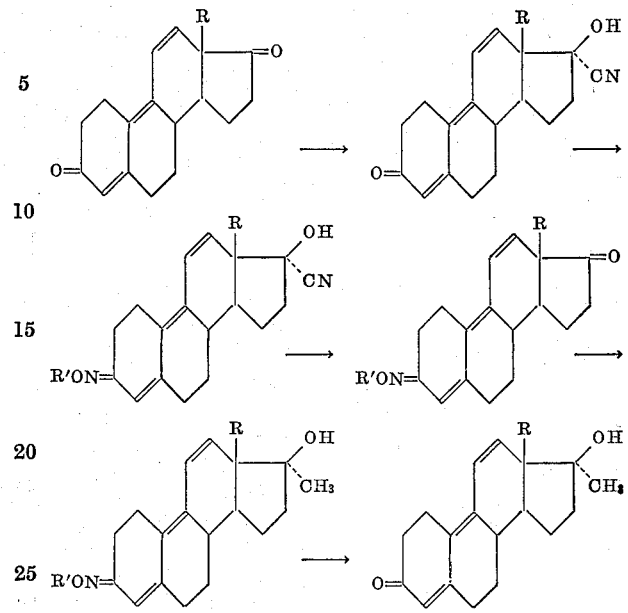

R is an alkyl of 1 to 4 carbon atoms and R' is selected from the group consisting of hydrogen and lower alkyl of 1 to 7 carbon atoms.

The formation of the cyanohydrin grouping may be effected with derivatives of hydrocyanic acid such as alkali metal cyanides in the presence of acetic acid or cyanohydrins of ketones such as 2-cyano-propanol-2.

The oximidation of the 3-keto group may be effected with hydroxylamine or lower alkyl hydroxylamine or acid addition salts thereof in the presence of a lower alkanol and an alkali metal bicarbonate or in the presence of pyridine.

The cyanohydrin group can be removed by reaction with a weak organic acid or a basic agent such as an alkali metal hydroxide in an aqueous lower alkanol. The 17-methylation may be effected with a methyl magnesium halide such as the bromide or iodide.

The removal of the 3-oximido group may be accomplished in aqueous media with a mineral acid such as sulfuric acid, hydrochloric acid, sulfurous acid, persulfuric acid or nitrous acid, the latter being obtained, for example, by starting out with acetic acid and sodium nitrite, or with an organic acid, such as oxalic acid. Another means to regenerate the ketone function in the 3-position consists in treating the 3-oximido compound in acid media with a carbonyl derivative such as formaldehyde, levulic acid or pyruvic acid. For example, with pyruvic acid the reaction has been accomplished under favorable conditions by working in aqueous acetic acid.

In the following example there are described several preferred embodiments to illustrate the invention. However, it should be understood that the invention is not to be limited to the specific embodiments.

EXAMPLE

*Preparaton of 17α-methyl-$\Delta^{4,9,11}$-estratriene-17β-ol-3-one*

Step A: Preparation of 17α-cyano-$\Delta^{4,9,11}$-estratriene-17β-ol-3-one.—While working in total absence of light, 1.8 gm. of $\Delta^{4,9,11}$-estratriene-3,17-dione were introduced into 5.4 cc. of 2-cyano-propanol-2 and 0.54 cc. of ammonia were added thereto. The mixture was agitated for a period of 17 hours at room temperature and then the reaction mixture was vacuum filtered, the precipitate was washed with ether and dried to obtain 1.6 gm. of 17α-cyano-$\Delta^{4,9,11}$-estratriene-17β-ol-3-one.

This compound is not described in the literature.

In an analogous manner, 13β-propyl-17α-cyano-Δ$^{4,9,11}$-gonatriene-17β-ol-3-one could be prepared from 13β-propyl-Δ$^{4,9,11}$-gonatriene-3,17-dione.

*Step B: Preparation of 3-oximido-17α-cyano-Δ$^{4,9,11}$-estratriene-17β-ol.*—While working in total absence of light, 415 mg. of hydroxylamine hydrochloride were introduced into 16 cc. of methanol. 502 mg. of sodium bicarbonate, 1.6 gm. of 17α-cyano-Δ$^{4,9,11}$-estratriene-17β-ol-3-one and a few cc. of water were added thereto and the mixture was heated at reflux for 1½ hours. The reaction mixture was then poured into ice water, vacuum filtered. The precipitate was washed and dried to obtain 3.5 gm. of raw, moist 3-oximido-17α-cyano-Δ$^{4,9,11}$-estratriene-17β-ol which was directly utilized for the next step.

This compound is not described in the literature.

In an analogous manner, 3-oximido-13β-propyl-17α-cyano-Δ$^{4,9,11}$-gonatriene-17β-ol could be prepared from 13β-propyl-17α-cyano-Δ$^{4,9,11}$-gonatriene-17β-ol-3-one.

*Step C: Preparation of 3-oximido-Δ$^{4,9,11}$-estratriene-17-one.*—While working in total absence of light, 3.5 gm. of raw, moist 3-oximido-17α-cyano-Δ$^{4,9,11}$-estratriene-17β-ol were introduced into 16 cc. of methanol and a mixture of 4 cc. of water and 1.08 cc. of concentrated sodium hydroxide were added. The reaction mixture was heated at reflux for 1 hour and then was poured into ice water, neutralized by the addition of dilute acetic acid, allowed to stand for 1 hour at a temperature of 0° C. and then vacuum filtered. The precipitate was washed with water and dried to obtain 1.51 gm. of 3-oximido-Δ$^{4,9,11}$-estratriene-17-one having a melting point of 190° C. and a specific rotation $[\alpha]_D^{20} = +151° \pm 2°$ (c.=0.5% in ethanol).

Ultraviolet spectra:

max. at 232 mμ, $E_{1cm.}^{1\%} = 110$ max. at 319 mμ, $E_{1cm.}^{1\%} = 1450$ max. at 332 mμ, $E_{1cm.}^{1\%} = 1285$ The product was insoluble in water, ether and dilute aqueous acids and alkalis and was soluble in alcohol and chloroform.

This product is identical with the compound described in copending U.S. patent application Serial No. 397,628 filed September 18, 1964 now U.S. Pat. 3,248,294.

In analogous fashion, 3-oximido-13β-propyl-Δ$^{4,9,11}$-gonatriene-17-one could be prepared from 3-oximido-13β-propyl-17α-cyano-Δ$^{4,9,11}$-gonatriene-17β-ol.

*Step D: Preparation of 3-oximido-17α-methyl-Δ$^{4,9,11}$-estratriene-17β-ol.*—1.10 gm. of 3-oximido-Δ$^{4,9,11}$-estratriene-17-one in 60 cc. of benzene were added at room temperature and under an atmosphere of nitrogen to 300 cc. of 1.67 N methyl magnesium bromide in ethereal solution. The reaction mixture was held at reflux for 15 hours and then cooled and 200 cc. of a saturated solution of ammonium chloride were added thereto. The mixture was extracted with ethyl acetate and the extract was washed with water and evaporated to dryness under vacuum. The residue was dissolved in methylene chloride and subjected to chromatography through magnesium silicate. The product was eluted with methylene chloride containing 1% of methanol, recrystallized from a benzene-hexane mixture to obtain 0.97 gm. of 3-oximido 17α-methyl-Δ$^{4,9,11}$-estratriene-17β-ol having a melting point of 135° C.

The product occurred in the form of pale yellow crystals soluble in acetone, benzene and chloroform.

The product is identical to the compound described in U.S. patent application Serial No. 397,628.

In analogous fashion, 3-oximido-13β-propyl-17α-methyl-Δ$^{4,9,11}$-gonatriene-17β-ol could be prepared from 3-oximido-13β-propyl-Δ$^{4,9,11}$-gonatriene-17-one.

*Step E: Preparation of 17α-methyl-Δ$^{4,9,11}$-estratriene-17β-ol-3-one.*—A mixture of 0.85 gm. of 3-oximido-17α-methyl-Δ$^{4,9,11}$-estratriene-17β-ol, 30 cc. of acetic acid, 3 cc. of pyruvic acid and 30 cc. of distilled water was maintained at reflux for 75 minutes with agitation and under a nitrogen atmosphere. The reaction mixture was cooled to room temperature, poured over an ice water mixture and sodium bicarbonate was added thereto. The mixture was vacuum filtered, washed with water and evaporated to dryness under vacuum. The residue was dissolved in methylene chloride and passed through a column containing 25 gm. of magnesium silicate. Then the product was eluted with methylene chloride containing 2% of acetone to obtain 17α-methyl-Δ$^{4,9,11}$-estratriene-17β-ol-3-one which upon recrystallization from a methanol-isopropyl ether mixture (1:4) had a melting point of 170° C. and a specific rotation $[\alpha]_D^{20} = -58.7°$ (c.= 0.5% in ethanol).

This product occurred in the form of pale yellow crystals insoluble in water and dilute aqueous acids and alkalis and soluble in ether, acetone and benzene.

*Analysis.*—$C_{19}H_{24}O_2$: Molecular weight=284.38. Calculated: C, 80.24%; H, 8.50%. Found: C, 80.3%; H, 8.3%.

Ultraviolet spectra (EtOH):

max. 239 mμ; $E_{1cm.}^{1\%} = 203$ inflex. 270 mμ, $E_{1cm.}^{1\%} = 122$ max. 342 mμ, $E_{1cm.}^{1\%} = 1035$ or $\epsilon 29,400$

*Infrared spectra:* In accord with the proposed structure.

This compound is identical to that described in U.S. patent application Serial No. 397,628.

In analogous fashion, 13β-propyl-17α-methyl-Δ$^{4,9,11}$-gonatriene-17β-ol-3-one could be prepared from 3-oximido-13β-propyl-17α-methyl-Δ$^{4,9,11}$-gonatriene-17β-ol.

Various modifications of the process of the invention may be made without departing from the spirit or scope thereof and it is to be understood that the invention is to be limited only as defined in the appended claims.

We claim:

1. A process for the preparation of 13β-alkyl-17α-methyl-Δ$^{4,9,11}$-gonatriene-17β-ol-3-ones of the formula

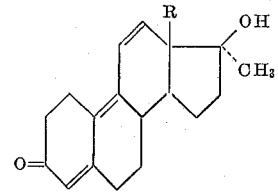

wherein R is an alkyl of 1 to 4 carbon atoms which comprises reacting 13β-alkyl-Δ$^{4,9,11}$-gonatriene-3,17-dione wherein the alkyl has 1 to 4 carbon atoms with a derivative of hydrocyanic acid to form 13β-alkyl-17α-cyano-Δ$^{4,9,11}$-gonatriene-17β-ol-3-one, reacting the latter with a compound selected from the group consisting of hydroxylamine, lower alkyl hydroxylamine and acid addition salts thereof to form the corresponding 3-oximido-13β-alkyl-17α-cyano-Δ$^{4,9,11}$-gonatriene-17β-ol, subjecting the latter to a compound selected from the group consisting of a basic agent and a weak organic acid to form 3-oximido-13β-alkyl-Δ$^{4,9,11}$-gonatriene-17-one, reacting the latter with a methyl magnesium halide to form 3-oximido-13β-alkyl-17α-methyl-Δ$^{4,9,11}$-gonatriene - 17β - ol and subjecting the latter to acid hydrolysis to form 13β-alkyl-17α-methyl-Δ$^{4,9,11}$-gonatriene-17β-ol-3-one.

2. The process of claim 1 wherein the hydrocyanic acid derivative is 2-cyano-propanol-2.

3. The process of claim 1 wherein the hydrocyanic acid derivative is an alkali metal cyanide and the reaction is effected in the presence of acetic acid.

4. The process of claim 1 wherein the 3-oximido group is formed in the presence of an alkali metal bicarbonate in a lower alkanol.

5. The process of claim 1 wherein the 3-oximido group is formed in the presence of pyridine.

6. The process of claim 1 wherein the 3-oximido-13β- alkyl-17α-cyano-Δ$^{4,9,11}$-gonatriene-17β-ol is reacted with an aqueous lower alkanol solution of an alkali metal hydroxide.

7. The process of claim 1 wherein the methyl magnesium halide is methyl magnesium bromide.

8. The process of claim 1 wherein the methyl magnesium halide is methyl magnesium iodide.

9. The process of claim 1 wherein the acid hydrolysis is effected with pyruvic acid in the presence of acetic acid.

10. The process of claim 1 wherein the starting material is Δ$^{4,9,11}$-estratriene-3,17-dione.

11. A process for the preparation of 17α-methyl-Δ$^{4,9,11}$-estratriene-17β-ol-3-one which comprises reacting Δ$^{4,9,11}$-estratriene-3-17-dione with a hydrocyanic acid derivative to form 17α-cyano-Δ$^{4,9,11}$-estratriene-17β-ol-3-one, reacting the latter with a compound selected from the group consisting of hydroxylamine, lower alkyl hydroxylamine and acid addition salts thereof to form the corresponding 3 - oximido-17α-cyano-Δ$^{4,9,11}$-estratriene-17β-ol, subjecting the latter to a compound selected from the group consisting of a basic agent and a weak acid to form 3-oximido-Δ$^{4,9,11}$-estratriene-17-one, reacting the latter with a methyl magnesium halide to form 3-oximido-17α-methyl-Δ$^{4,9,11}$-estratriene-17β-ol and subjecting the latter to acid hydrolysis to form 17α-methyl-Δ$^{4,9,11}$-estratriene-17β-ol-3-one.

12. A process for the preparation of 3-oximido-13β-alkyl-Δ$^{4,9,11}$-gonatriene-17-one of the formula

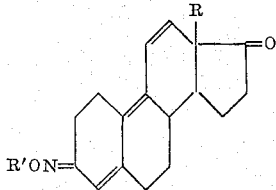

wherein R is an alkyl of 1 to 4 carbon atoms and R′ is selected from the group consisting of hydrogen and lower alkyl which comprises reacting 13β-alkyl-Δ$^{4,9,11}$-ganotriene-3,17-dione wherein the alkyl has 1 to 4 carbon atoms with a hydrocyanic acid derivative to form 13β-alkyl-17α-cyano-Δ$^{4,9,11}$-gonatriene-17β-ol-3-one, reacting the latter with a compound selected from the group consisting of hydroxylamine, lower alkyl hydroxylamine and acid addition salts thereof to form the corresponding 3-oximido-13β-alkyl-17α-cyano-Δ$^{4,9,11}$-gonatriene-17β-ol and subjecting the latter to a compound selected from the group consisting of a basic agent and a weak organic acid to form 3-oximido-13β-alkyl-Δ$^{4,9,11}$-gonatriene-17-one.

13. A compound of the formula

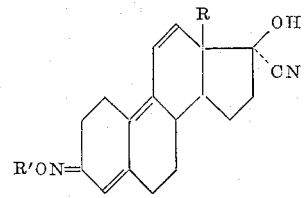

wherein R is an alkyl of 1 to 4 carbon atoms and R′ is selected from the group consisting of hydrogen and lower alkyl of 1 to 7 carbon atoms.

14. 3-oximido-17α-cyano-Δ$^{4,9,11}$-estratriene-17β-ol.

15. A compound of the formula

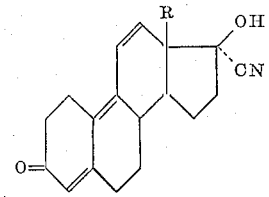

wherein R is an alkyl of 1 to 4 carbon atoms.

16. 17α-cyano-Δ$^{4,9,11}$-estratriene-17β-ol-3-one.

No references cited.

LEWIS GOTTS, *Primary Examiner.*

HENRY A. FRENCH, *Assistant Examiner.*